Dec. 23, 1941.  J. A. CHATER  2,267,641
FRUIT BRUSHING MACHINE
Original Filed Sept. 17, 1938  2 Sheets—Sheet 1

Inventor
John A. Chater
By A. S. McDaniel
Attorney

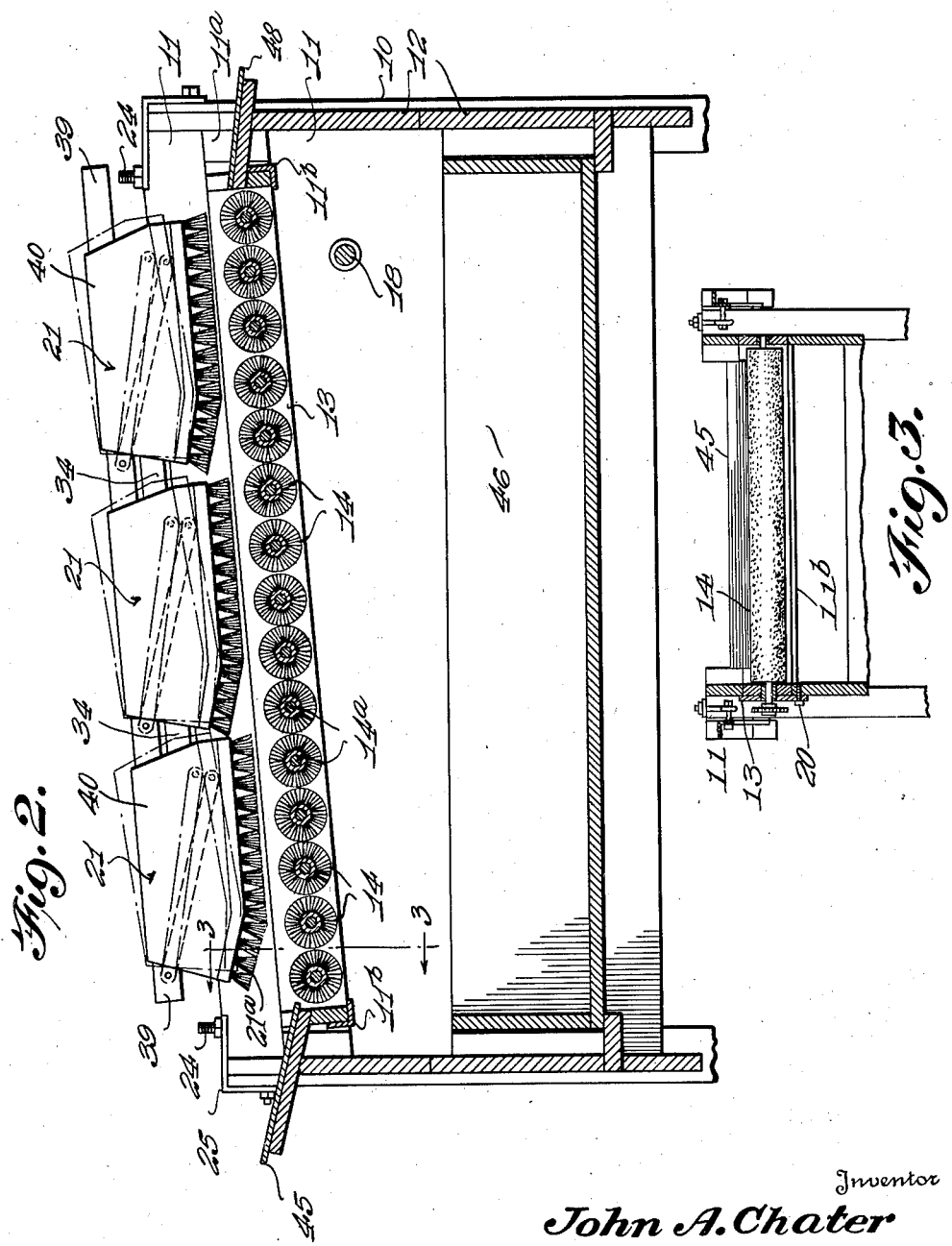

Patented Dec. 23, 1941

2,267,641

UNITED STATES PATENT OFFICE 2,267,641

FRUIT BRUSHING MACHINE

John A. Chater, Medina, N. Y., assignor to Niagara Sprayer and Chemical Co., Inc., Middleport, N. Y., a corporation Original application September 17, 1938, Serial No. 230,513. Divided and this application October 3, 1940, Serial No. 359,603

3 Claims. (Cl. 146—202)

The present invention relates to a brushing machine for rollable objects and particularly is designed for the brushing of fruit, such as apples, pears, peaches, and the like, although it will be obvious that the machine may be used for other brushing purposes.

Brushing machines heretofore used for brushing fruit and vegetables, and of which the applicant has knowledge, have comprised longitudinal or transverse revolving brushes along which or over which the fruit or articles to be treated have been passed. In some instances, where transverse brushes are used as a bed, there has been disposed various type of over-hanging brushes and/or clean-out means, some on an endless chain and others being flat brushes mounted in one manner or other to have no travel movement.

The aim of the present machine is to improve the construction and brush action over prior machines which have been employing overlying brushes, aforesaid; and also to provide brushes in such a machine which while mounted above a lower bed of revolving brushes, will nevertheless progress the fruit through the machine in order that each piece of fruit or article being treated is moved through the machine independently of all other fruit so that no fruit will be left in the machine at the end of a run, thus eliminating any damage to the fruit or to the brushes and making it unnecessary to raise or remove any portion of the top brushes to determine whether or not fruit has remained in the machine or to clean out the fruit by hand or by special mechanical means.

The important feature of the invention of this application resides in the novel means and construction by which the bed of revolving brushes may be assembled and removed from the machine as a unit.

With the above and other objects in view, the invention also resides in the sundry details of construction, combination and arrangement of parts hereinafter more fully described and pointed out in the appended claims.

In the drawings, which show the preferred embodiment of the invention as at present devised.

Fig. 2 is a central longitudinal sectional view of the machine showing Fig. 1; and Figure 3 is a transverse sectional view taken substantially on line 3—3 of Figure 2.

Throughout the specification and drawings, like characters of reference will denote similar like parts.

Figure 1:
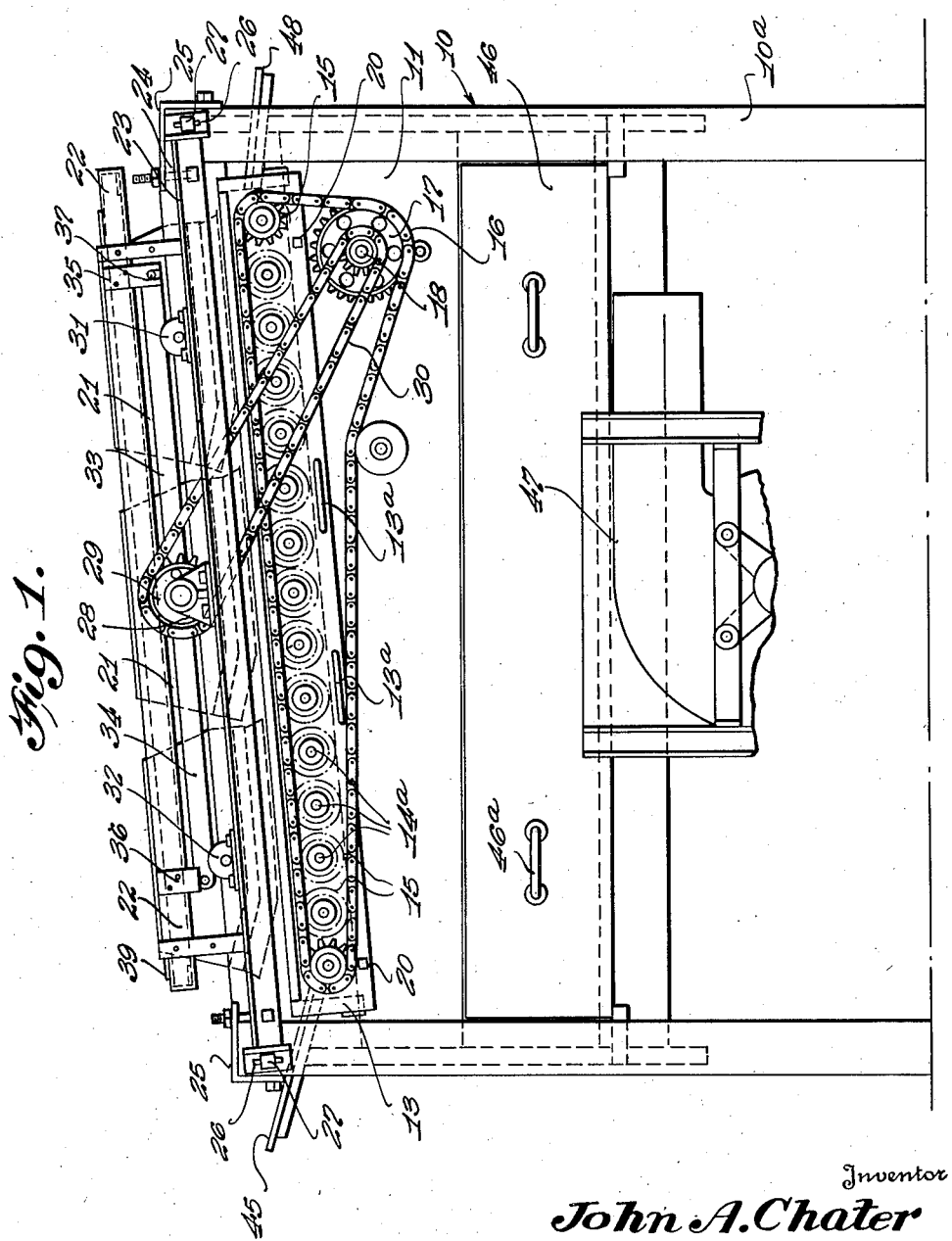
Fig. 1 is a side view of the brushing machine of the present invention.

Generally stated, the brushing machine of the present invention comprises a plurality of substantially parallel cylindrical revolving brushes 14 arranged side by side and sufficiently close to form a bed or conveying surface for supporting the articles to be treated which pass thereover from the intake end 45 of the machine to the discharge end 48 thereof. This bed of cylindrical revolving rollers 14 is mounted in a drawer-like frame to be insertable into and removable from the main frame as a unit and is slightly more elevated from the horizontal at its discharging end 48 than at the receiving end 45 of the machine.

Above the bed of cylindrical brushes 14, a plurality of substantially flat top brushes 21 are mounted with their lower surfaces approximately parallel to the lower bed of cylindrical revolving brushes. These top brushes 21 are all free to move independently of a vertical plane, but not transversely or longitudinally of the machine, although this bank of top brushes does have, as a unit, a gyratory movement on a vertical plane longitudinally of the machine. This gyratory movement of the top brushes 21 is such as to alternately move the entire bank of top brushes against and then with the travel of the fruit through the machine, but, while the top brushes are moving against the travel of the machine they are elevated more than they are while they are moving in the direction of fruit travelling through the machine, all of which is claimed and described more in detail in copending application Serial No. 230,513, filed September 17, 1938, of which this application is a division.

Referring in detail to the drawings, the brushing machine comprises a main frame 10 having four corner posts 10a connected by side pieces 11 and end pieces 12. The side pieces 11 are slotted or otherwise deformed to provide a drawer space 11a into which a rectangular frame 13 is removably positioned and supported by suitable means 11b within the confines of the frame 10. The drawer space 11a is inclined upwardly from the intake end 45 of the machine to the discharge end 48 thereof, thus correspondingly inclining the frame 13.

The brush-bed frame 13 supports a plurality of rotatable cylindrical substantially parallel brushes 14 arranged side by side therein and extending transversely of the machine, the spacing between the brushes being such as will maintain them out of contact, but provide a brushing bed or conveying surface for the fruit placed therein and having the inclination of the frame 13. The length of the brushes 14 may vary, of course, according to the width of the machine with which they are used but, in any case, extend from one side 11 of the brush-bed frame 13 to the other.

The shafts 14a of the cylindrical brushes 14 are journalled at their ends for rotation in the side members of the frame 13. At least one end of each shaft 14a has a sprocket 15 thereon and disposed on the outer sides of the frame 13. The sprockets 15 have a sprocket chain 16 passing thereover and over a sprocket wheel 17 fast on the drive shaft 18 journalled in the frame 10 of the machine and driven from any source of power. After the removal of the sprocket chain 16 and the bolts, screws or other fasteners 20, the frame 13 carrying the brushes 14 may be moved as a unit from the side of a machine. It is understood, of course, that the upper surface of the brushes 14 rotate in the direction of travel of the fruit through the machine.

The top brushes 21 are carried by a frame 22 disposed above the cylindrical rotating brushes 14. The frame 22 comprises, preferably, a rectangular frame of side and end bars and is supported for reciprocating or gyrating movement by rails 23, one disposed on each side of the machine at the top portion of the frame 10, the rails 23 being inclined corresponding to the inclination of the frame 13. The rails 23 are supported by an adjustable hanger 24, in the form of screw rods, connecting the ends of the rails with a bracket 25, preferably secured to each corner of the machine, the rails having their ends vertically slotted, as at 26, through which extends a guide pin 27 projecting from the posts 10a.

Intermediate the length of each rail 23 is disposed a bearing 28, in which is rotatably mounted a sprocket wheel 29 driven by a chain 30 from the shaft 18. Mounted on each of the rails 23 and on opposite sides of the bearing 28 (preferably at equal distances therefrom) are grooved rollers 31 and 32, respectively, journalled on substantially horizontal axes and resting edgewise on the rollers 31 and 32 and in the grooves thereof are flat rods 33 and 34, respectively, the inner ends of these rods being connected eccentrically with the sprocket 29, or by some other equivalent means for reciprocating their rods by movement imparted by rotation of the sprocket 29.

The top brush frame 22 rests upon the outer ends of the rods 33 and 34 by means of downwardly extending lugs 35 and 36, secured to each side of the frame 22, adjacent its end portions, respectively, and having their lower ends contacting said rods 33 and 34.

Each of the top brushes 21 comprises a tubular holder 40 preferably rectangular in cross-section to provide a flat top surface to rest squarely on its brush supporting bar 39, a flat bottom side carrying the brush bristles and flat side walls so that the brushes can be placed closely together side by side in the machine.

Fruit is received at the forward end of the machine on a chute or other equivalent means 45 and rolls down to the bed of revolving rollers 14, from whence it is carried under the upwardly inclined forward end 21a of the first top brushes and, due to the reciprocating and gyrating action of the top brush frame 22 above described and the rotation of the brushes 14, is positively progressively fed through the machine, the fruit being thoroughly brushed and turned from side to side as it moves from valley to valley between the rotating brushes 14, thus eliminating the necessity for any type of special clean-out means, either of a manual or mechanical nature. The top brushes 21 raise and lower in a vertical plane as the fruit passes thereunder and due to the manner in which they are mounted, each brush may tilt longitudinally of the machine to contact fruit of any size travelling thereunder so as to thoroughly clean the same.

It will be observed from the above that, if it is desired to adjust the top brushes 21 vertically with respect to the bed of revolving brushes 14, proper manipulation of the screws 24 will adjust the entire system of top brushes for any desired distance above the revolving brushes 14, thus accommodating the machine to different size or run of fruit to be treated, and by removing the chute boards 45 and 48, the sprocket chains 16 and 30 and the fasteners 20, the bedbrushes 14 may be replaced as a unit through the side of the machine without necessitating a practical dismantling of the machine to remove or replace the bed-brushes as has been heretofore required, by merely inserting or withdrawing the drawer-like brush-bed frame 13 through the medium of the drawer handles 13a.

In the treating of fruit or other articles from which there is a dust, fuzz, or other residue, such may be collected in a bottom pan 46 underlying the rotary brushes 14. In such instances as may be desirable, the bottom pan 46 may be connected with an exhaust fan 47 (of any approved type) for removing such dust or residue from the machine. Due to the close disposition and arrangement of the top brushes 21 and of the side members 11, the machine is sufficiently enclosed to enable the suction fan to be effective for not only removing the dust from the pan 46 but for cleaning the brushes. The dust pan or drawer may be withdrawn and replaced by means of the handles 46a.

Having thus described the invention and the manner in which the same is to be performed, it is to be understood that the invention is not limited to the exact construction herein shown and described as many modifications and variations may be made therein, which fall within the scope of the appended claims.

What is claimed is:

1. In a fruit treating machine, a main frame, a bed of cylindrical rolls over which passes fruit being treated in the machine, a frame in which said rolls are mounted, said roll supporting frame being slidably mounted in the main frame for movement through one side of the main frame, whereby said rolls may be removed from and replaced into the main frame as a unit, and means on the main frame detachably connected with said rolls for rotating the same.

2. In a fruit brusher, a main frame, slots formed in each side of said main frame, a supplementary frame, a series of rotatable brushes journaled in said supplementary frame, said supplementary frame having a slidable fit into the slots in said main frame whereby said brushes may be removed and replaced as a unit with respect to the main frame, guide means between the slots in said main frame, a flange on one side of the supplementary frame for bearing against the main frame adjacent to the sides of one slot for positioning the brushes with respect to the main frame.

3. In a fruit brusher, a main frame with a slot formed in each side thereof for enabling the lateral insertion thereinto of a supplementary drawer-like frame having a series of rotatable brushes journaled therein, the width between the sides of the supplementary frame being substantially equal to the width between the sides of the main frame so that the sides of the supplementary frame will fit into the slots in the main frame, the width of said slots in the main frame being substantially equal to the width of the sides of the supplementary frame.

JOHN A. CHATER.